Sept. 6, 1966 R. J. McNAIR 3,271,681

AUTOMATIC SYSTEM FOR CORRECTING FOR DOPPLER SHIFT IN SINGLE SIDEBAND COMMUNICATIONS EQUIPMENT

Filed Feb. 3, 1964 2 Sheets-Sheet 1

INVENTOR.
ROBERT J. McNAIR
BY Alden D. Redfield
Irwin P. Garfinkle
ATTORNEYS.

Sept. 6, 1966 R. J. McNAIR 3,271,681

AUTOMATIC SYSTEM FOR CORRECTING FOR DOPPLER SHIFT IN SINGLE SIDEBAND COMMUNICATIONS EQUIPMENT

Filed Feb. 3, 1964 2 Sheets-Sheet 2

INVENTOR.
ROBERT J. McNAIR
BY Alden W. Redfield
Irvin P. Garfinkle
ATTORNEYS.

3,271,681
Patented Sept. 6, 1966

3,271,681

AUTOMATIC SYSTEM FOR CORRECTING FOR DOPPLER SHIFT IN SINGLE SIDEBAND COMMUNICATIONS EQUIPMENT

Robert J. McNair, Cincinnati, Ohio, assignor to Avco Corporation, Cincinnati, Ohio, a corporation of Delaware Filed Feb. 3, 1964, Ser. No. 342,085
15 Claims. (Cl. 325—65)

Figures 1, 2:
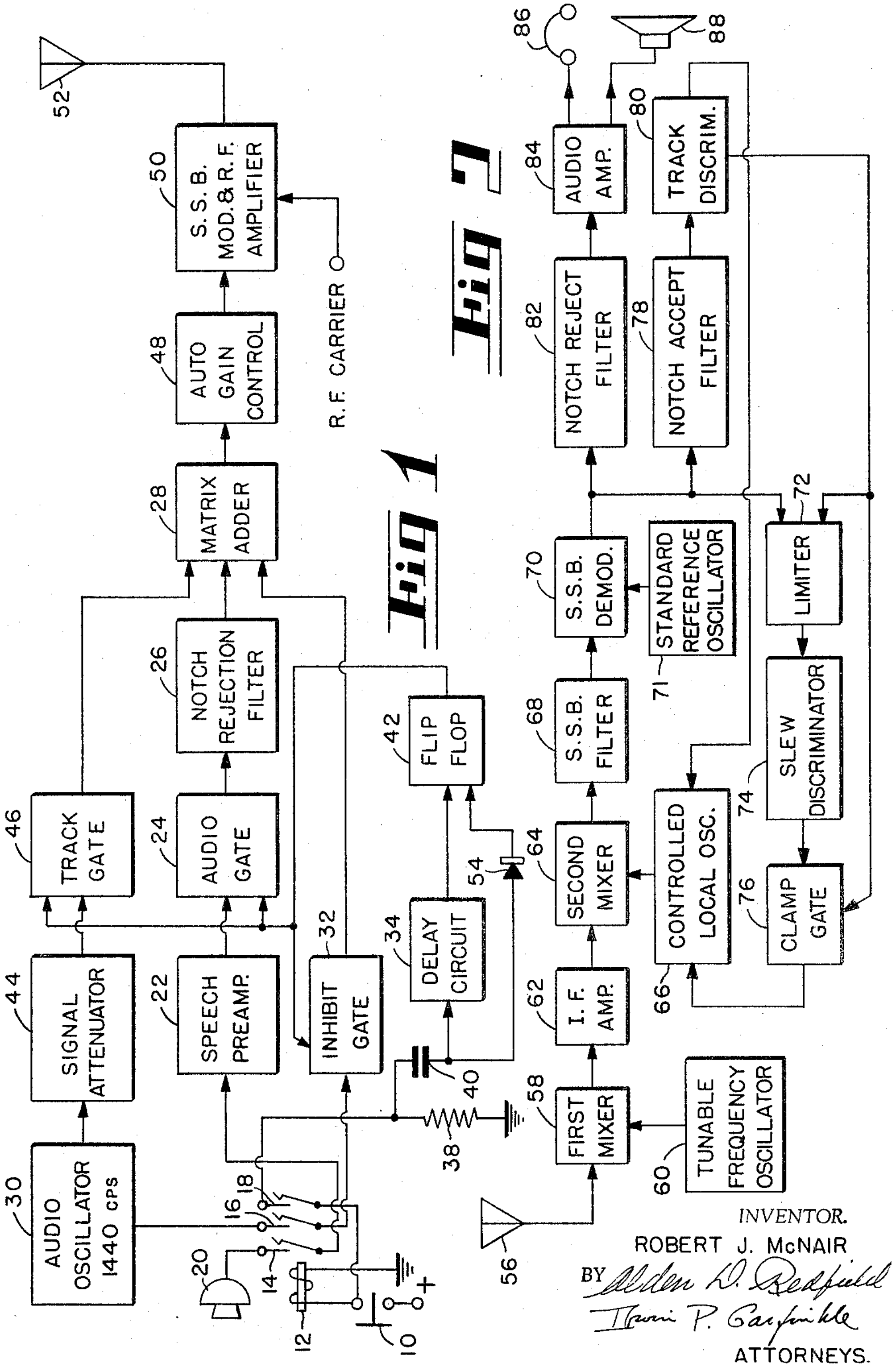

This invention relates to a Doppler-shift compensator, and more particularly to a system for automatically correcting for Doppler shift in single sideband transmitters and receivers used in communicating between stations moving at relatively high speeds with respect to one another. The system finds primary application in airborne single sideband radio communications equipment operating in the UHF spectrum.

It is well known that Doppler-shift compensation is needed to maintain reliable two-way voice communications over an air-to-air VHF/UHF single sideband link. To place the problem in perspective, assume that a communications link is to be established between two aircraft, each flying in opposite directions at 1250 miles per hour, and that at the beginning of communications the aircraft are 20 miles apart heading for the same navigational fix. The Doppler shift is calculated by means of the known derived formula $F_d=44.7V_r/\lambda$, where $F_d$ is Doppler shift in cycles; $V_r$ is the radial velocity of the target receiver with respect to the transmitter measured in miles per hour; and λ is the wavelength of the carrier in centimeters.

If in the example the communications equipment is operating in the UHF range at 300 megacycle (100 centimeters), the resulting Doppler shift is 1118 cycles. At 60 megacycles, the shift is about 224 cycles. Further, the total excursion of the carrier due to effects of Doppler is twice that calculated, since there is a change in sign depending on whether the transceivers are getting closer together or farther apart. Thus, at UHF, there may be a Doppler shift in the order of several thousand cycles, and it is this type of problem which this invention seeks to solve.

It is the primary object of this invention to provide automatic means for correcting for Doppler shift without materially increasing bandwidth or power requirements.

Another object of this invention is to correct for Doppler shift by transmitting a control tone for adjusting a remote receiver prior to transmission of intelligence.

Another object of this invention is to correct for Doppler shift by transmitting an audio control tone for adjusting the receiver prior to transmission of audio intelligence and subsequently to transmit a low power tracking tone for maintaining the receiver in adjustment.

Briefly stated, the described Doppler-compensation system provides for the transmission of a reference tone at a mid audio frequency, e.g., 1440 cycles, as soon as the transmitter operator depresses the push-to-talk switch on his microphone. However, the speech pre-amplifier is locked out for a preset delay time, e.g., 125 milliseconds, thus permitting transmission of radio frequencies modulated only by the reference tone. During this delay time, the addressed station receives the now Doppler-shifted reference tone, and by means of a frequency discriminator, slews the local oscillator to null the reference tone. Nulling is accomplished within the delay period, after which speech signals are passed by the preamplifier at the transmitter to modulate the radio frequency carrier. The reference tone may be included in the transmitted speech wave train as tracking data with functional operation similar to that described in the application of C. A. Bucher entitled "Doppler-Shift Corrector for Single Sideboard Communications Systems," Serial No. 342,170, filed on the same day and assigned to the same assignee as this invention. Alternatively, after the present delay time, a special tracking tone may be transmitted along with or between phrases of the spoken message. In the first case the tracking tone is included in a redundant rejected portion of the intelligence spectrum, while in the latter case, the tracking tone may be a sub-multiple of the reference tone selected to be below the audio spectral response of the receiving operator's headset.

Figures 3, 4:
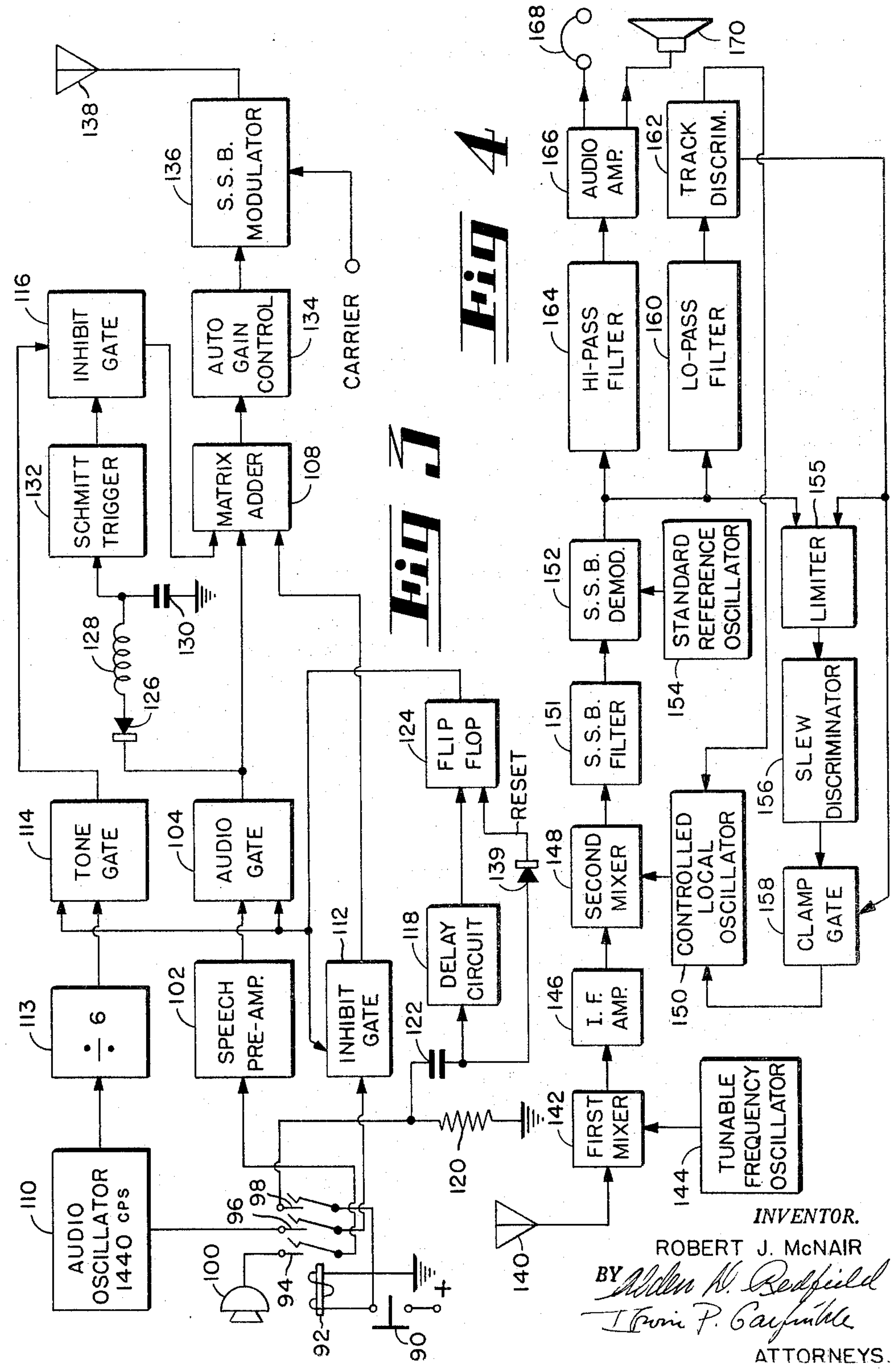

For further objects and for a clearer understanding of the precise nature of this invention, reference should now be made to the following detailed specification and to the accompanying drawings in which:

FIGURES 1 and 2 represent, respectively, a single sideband transmitter and receiver in accordance with one embodiment of this invention; and FIGURES 3 and 4, respectively, represent a single sideband transmitter and receiver in accordance with an alternate embodiment of this invention.

Referring first to the embodiment of FIGURES 1 and 2, the transmitter includes a micorphone switch 10 which when depressed serves to energize a relay 12 from a battery, or other suitable direct current source, to close three parallel sets of contacts 14, 16, and 18.

The contacts 14 connect a microphone 20 to a speech pre-amplifier 22, the output of which is applied through a normally closed audio gate 24 and a notch reject filter 26 to a matrix adder 28.

The contacts 16 connect the output of an audio oscillator 30 to the adder 28 through a normally open inhibit gate 32. The audio oscillator 30 generates a fixed audio frequency reference tone selected from a redundant portion of the speech spectrum. In the particular exemplary embodiment, a frequency of 1440 cycles is used. The notch reject filter is tuned to reject a band of frequencies entered at the reference tone frequency. The output from the audio oscillator 30 is also applied to the matrix adder 28 through a signal attenuator 44 and a normally closed tracking gate 46.

The third set of contacts 18 connects the battery to a delay circuit 34 through a pulse-shaping network comprising a resistor 38 and a capacitor 40.

Initially, when the contacts 14 and 16 and 18 are closed by depressing the switch 10, the reference tone output from the audio oscillator 30 is applied through the open inhibit gate 32 to the matrix adder 28. Any speech applied from the microphone to the speech pre-amplifier is locked out from the matrix adder 28 because the audio gate 24 is closed. Similarly, the output from the signal attenuator 44 is locked out from the matrix adder 28 by the normally closed tracking gate 46. Thus, initially only the reference tone is applied to the matrix adder 28. The delay circuit 34 has a predetermined time constant of approximately 125 milliseconds, at the end of which an output is developed for turning on a flip-flop circuit 42. The output of the flip-flop is applied simultaneously to the gate 32, the audio gate 24, and the tracking gate 46. The turning on of the flip-flop does three things: First, it inhibits the inhibit gate 32, thereby preventing the passage of the reference tone through the inhibit gate to the matrix adder 28; second, it opens the audio gate 24, allowing the output of the speech pre-amplifier 22 to pass through to the matrix adder 28; and, third, it allows the reference tone output, reduced by the signal attenuator 44, to pass through the tracking gate 46 into the matrix adder 28. Thus, 125 milliseconds after the closing of contacts 18, speech applied to the pre-amplifier 22 along with the attenuated reference tone from the signal attenuator 44 are simultaneously applied to the matrix adder, while the output from the inhibit gate 32 is prevented.

During the delay period, the output of the matrix adder 28 consists of the reference tone generated in the audio oscillator 30. At or near the end of the delay period, the reference tone is cut off. Use of a capacitor-type charging circuit in the inhibit gate 32 and the audio gate 24 allows the reference tone tracking signal to be passed by the tracking gate 46 prior to drop-out of the reference tone coming through the inhibit gate 32. Thereafter, the output of the matrix adder 28 consists of the amplified audio wave train impressed on the microphone 20 and the reference tone passed by the tracking gate 46. The notch reject filter 26 blanks out those components of the speech wave train in a band centered at the frequency of the audio oscillator, for example, between 1300 and 1580 cycles per second. Insertion of the reference tone at 1440 cycles in this manner preserves the maximum information efficiency of the system since very little power is present in the human voice in this region of the spectrum.

The composite output of the matrix adder 28 is amplitude-conditioned by an automatic gain control circuit 48 and serves to modulate an R.F. carrier in a single sideband modulator 50. The resulting radio carrier information is radiated from antenna 52. When the microphone switch 10 is released, the flip-flop is reset by the discharge of capacitor 40 through a diode 54, and the system is again prepared for a subsequent transmission.

In the single sideband receiver (see FIGURE 2), the audio information is recovered and the impressed tracking tone data is used to compensate for Doppler shift. The front end of the single sideband receiver is illustrated in conventional form, that is the single sideband R.F. carrier is gathered by antenna 56 and converted to the proper intermediate frequency by means of a first mixer 58 and a tunable frequency oscillator 60. The output of the first mixer 58 is amplified in an intermediate frequency amplifier 62 and then converted to a second and lower intermediate frequency by means of a second mixer 64 and a controlled local oscillator 66. (This implementation applies only to double conversion receivers.) The appropriate component of information passed by the second mixer 64 is filtered by a single sideband filter stage 68. To this point, with the exception of the controlled local oscillator 66, the system is conventional. Operation of the remainder of the receiver is explained on a time sequence-of-events basis.

During the 125-millisecond delay period between the depressing of the switch 10 and the operation of the flip-flop circuit 42 in the transmitter portion of the system, only that information stemming from the original reference tone applied through the inhibit gate 32 to the matrix adder 28 is present at the antenna 56 and derived at the output of a single sideband demodulator 70. The voltage wave train representing this tone is applied to the single sideband demodulator 70, to which the output of a standard reference oscillator 71 is also applied for carrier insertion. The output from the demodulator 70 is then applied to a limiter 72, and the amplitude-proportioned output from the limiter 72 is applied to a slew discriminator 74 tuned to the frequency of the reference tone. The output of the discriminator 74 is a direct current signal having polarity and magnitude proportional to the difference between the actual radio frequency generated at the transmitter and the frequency generated in the tunable frequency oscillator 60 less the operational frequency of the intermediate frequency amplifier 62. (It will be understood that the direct current level of the output of the slew discriminator 74 is proportional to the frequency shifts due both to the Doppler and those due to operational errors in both tunable oscillator 60 and local oscillator 66; however, in this description it is assumed that the various oscillators operate at their assigned frequencies.) The output from slew discriminator 74 passes through a normally open clamp gate 76 and serves to tune the voltage-controlled local oscillator 66 to the proper frequency with which to obtain the correct reference tone signal output from the single sideband demodulator 70.

It will be understood that the controlled local oscillator 66 must have a relatively fast frequency shift response time with respect to the 125-millisecond delay period, when only the reference tone is being injected into the matrix adder of the transmitter, so that prior to the end of the delay period, the output from the slew discriminator 74 will have shifted the operating frequency of the oscillator 66 sufficiently to allow the output of the single sideband demodulator 70 to be passed by a notch accept filter 78. The pass-band characteristics of the filter 78 are such that signals within a small pass band centered at the reference tone frequency (for example, between 1300 and 1580 cycles) are attenuated very little, while frequencies outside of this band are greatly attenuated. Signals passing through the filter 78 are demodulated in a tracking discriminator 80 which accomplishes two functions.

First, the presence of the reference tone in the output of the tracking discriminator 80 serves to actuate clamp gate 76 and to inject a bias signal into the limiter 72. The activation of the clamp gate 76 closes the gate while the injection of the bias signal to the limiter 72 appreciably decreases the normal gain of the stage. Second, the presence of the reference tone signal in the tracking discriminator 80 provides an output voltage which serves as additional reference data with which to control the local oscillator 66. For example, suppose that the local oscillator 66 was off frequency by 50 cycles at the time the clamp gate 76 closed. Under these circumstances the reference tone signal passed by the matrix adder 28 at the transmitter would then appear as either a 1390 or 1490-cycle tone at the output of the single sideband demodulator 70, depending on the sense of the 50-cycle error. The output of the tracking discriminator 80 will be a direct voltage of appropriate polarity to further drive the local oscillator 66 so as to correct the 50-cycle error.

The internal time constants of the tracking discriminator 80 are established so that its output responds rapidly to new data. However, sufficient persistence is included so that its output does not vary by more than 1% during temporary fades in received signal strength at the antenna.

It will be understood that at the end of the 125-millisecond delay period, speech data is also passed by the single sideband demodulator 70, and this is acted upon by a notch reject filter 82 having a transfer characteristic which matches that of the notch reject filter 26 of the transmitter. The data passed by the filter 82 is then applied in the conventional manner to an audio amplifier 84 and a suitable transducer such as a headset 86 or loud speaker 88.

If for any reason the rate of change of Doppler is so great that the combination of filter 78 and tracking discriminator 80 cannot follow the change in received frequency, re-acquisition is possible. For example, loss of tracking might occur when two supersonic aircraft flying in opposite directions met and pass at close range while communicating. Re-acquisition comes about as follows: Loss of tracking data in discriminator 80 unclamps limiter 72 and opens clamp gate 76. The output from the slew discriminator 74 then adjusts the local oscillator 66 such that the tracking tone is rapidly brought back within the range of the notch accept filter 78. Once it is within the range of the filter 78, an output is developed from the tracking discriminator which again closes the clamp gate 76 and serves to take control of the oscillator 66.

The embodiment of FIGURES 3 and 4 differs from the embodiment of FIGURES 1 and 2 in that the use of notched filters is obviated. In the transmitter illustrated in FIGURE 3, the pushing of a microphone switch 90 connects relay 92 across a battery, or other convenient direct current source, energizing the relay and closing three sets of contacts 94, 96, and 98. One set of contacts 94 connects microphone 100 to a speech pre-amplifier 102, the output of which is connected through a normally closed audio gate 104 to a matrix adder 108. The second set of relay contacts 96 connects the output of an audio oscillator 110 to the matrix adder 108 through a normally open inhibit gate 112. The output from the audio oscillator 110 provides a fixed reference tone which, in the example illustrated, is 1440 cycles. The output from the audio oscillator 110 is also applied to the matrix adder 108 through a second path including a frequency divider 113, a normally closed reference tone gate 114, and a normally closed inhibit gate 116. In the exemplary embodiment, a frequency division of 6 is accomplished to provide a 240-cycle-per-second reference tone.

The third set of contacts 98 serves to inject a positive-going pulse from the battery into a delay circuit 118, the shape of the pulse being controlled by means of a resistor 120 and a capacitor 122. Delay circuit 118 has a preset time constant, in the instant example 125 milliseconds, at the end of which time its output serves to turn on a flip-flop circuit 124. The turning on of the flip-flop circuit 124 does three things: First, its output inhibits the 1440-cycle-per-second reference tone by closing the inhibit gate 112; secondly, its output opens the audio gate, allowing the output of the speech pre-amplifier to pass through to the matrix adder 108; and, thirdly, its output opens the tone gate 114, allowing the frequency-divided 240-cycle-per-second tone output from the frequency divider 113 to pass through the tone gate 114 to the inhibit gate 116.

During the 125-millisecond delay period, only the 1440-cycle-per-second tone is transmitted and it is used for slewing the receiver onto approximately the correct frequency. The 240-cycle-per-second frequency-divided reference tone is used as the tracking reference once the delay period is over and the receiver presumably has been adjusted. For this purpose, the output from the tone gate 114 is applied to the matrix adder only when the inhibit gate 116 is open. This is accomplished by means of a rectifier 126 in combination with a low-pass filter including an inductor 128 and a capacitor 130 and a Schmitt trigger 132. The speech wave train coming through the audio gate 104 is analyzed on a power spectrum basis in the rectifier-filter combination which serves to smooth the total combination of the speech spoken into microhpone 100 to a syllabic rate having a mean frequency of about 15 cycles per second. The syllabic fluctuation in power level is used to trigger the Schmitt trigger circuit 132 on and off. When the Schmitt trigger 132 is in the "on" state, the inhibit gate 116 is closed to stop the passage of the frequency-divided reference tone. However, when the instantaneous power level of the speech wave train coming from the audio gate 104 drops below a preset threshold level, the Schmitt trigger 132 is triggered on, and the inhiit gate 116 opens to pass the frequency-divided reference tone to the matrix adder 108.

The composite output of matrix adder 108 is amplitude-conditioned by an automatic gain control circuit 134 and then modulates a radio frequency carrier in a conventional single sideband modulator 136. The resulting radio carrier information is radiated from an antenna 138.

Upon release of the microphone switch 90, the flip-flop is reset by the discharge of the capacitor 122 through a diode 139.

In summary, the output of the matrix adder 108 has the following forms: For the initial delay period after the microphone switch 90 is depressed, the output of the matrix adder 108 consists of the 1440-cycle-per-second tone applied from the audio oscillator 110 through the inhibit gate 112. At or near the end of the delay period the 1440-cycle-per-second reference tone is cut off at the inhibit gate 112 by the output from the flip-flop 124. The frequency-divided reference tone (at 240 cycles per second) is passed through the opened tone gate 114, and the amplified speech wave train from the speech pre-amplifier 102 is passed through the opened audio gate 104. The use of a capacitor-type charging circuit (not shown) in the inhibit gate 112 and in audio gate 104 allows the opening of the tone gate 114 just prior to drop-out of the 1440-cycle-per-second tone. The 240-cycle-per-second tone is applied to the matrix adder 108 only when the power level of the speech is below a predetermined level, and thus is inserted between syllables and intervals between words spoken into the microphone 100. Thus, unlike the previous embodiment, all of the speech spectrum is preserved and the system operates at maximum efficiency in this regard.

At the single sideband receiver (see FIGURE 4) the audio information is recovered and the tracking tone data is used to compensate for Doppler shift. The front end of the receiver is conventional, that is, the single sideband radio frequency carrier is gathered by antenna 140 and converted to the proper intermediate frequency by means of a first mixer 142 in a tunable frequency oscillator 144. The output of the mixer 142 is amplified in intermediate frequency amplifier 146 and converted to a second and lower intermediate frequency by means of a second mixer 148 and a controlled local oscillator 150. The appropriate component of information passed by the second mixer 148 is filtered by a single sideband filter stage 151, and the output of the filter 151 is applied to a single sideband demodulator 152, to which the output of a standard reference oscillator 154 is also applied for conventional carrier reinsertion.

The remainder of the receiver is explained on a time sequence-of-events basis. During the delay period, that is the first 125 milliseconds after radio frequency data from the FIGURE 3 transmitter comes into the receiving antenna, only that portion of the information originating from the audio oscillator 110 and applied to the matrix adder 108 through the inhibit gate 112 will be present at the output of the single sideband filter 151. The voltage wave train representing the 1440-cycle-per-second tone is demodulated in a demodulator 152 and limited in a limiter 155. The amplitude-proportioned output of the limiter 155 is then injected into a slew discriminator 156 tuned to the 1440-cycle-per-second reference tone and having a direct current output with a polarity and level representing the difference between the actual radio frequency generated at the transmitter and the frequency generated in the tunable frequency oscillator 144 less the operational frequency of intermediate frequency amplifier 146. The output from the slew discriminator 156 is passed through a normally open clamp gate 158 to the input of the controlled local oscillator 150 and serves to tune the oscillator to the proper frequency with which to obtain a 1440-cycle-per-second signal output from the single sideband demodulator 152. The voltage-controlled local oscillator 150 is designed with a frequency shift response time which is fast with respect to the 125-millisecond delay period during which the 1440-cycle-per-second tone is being injected into the matrix adder 108 of the transmitter at the beginning of each channel activation cycle.

Just prior to drop-out of the 1440-cycle-per-second tone from the transmitter, the frequency-divided 240-cycle-per-second audio tone appears at the output of the single sideband demodulator 152. This signal is passed by a low-pass filter 160 to drive the input of a tracking discriminator 162. The transfer characteristic of filter 160 is such that frequencies slightly above the frequency-divided reference tone of 240 cycles are increasingly attenuated. For example, the low-pass filter will greatly attenuate signals above 300 cycles per second. On the other hand, an input of less than 300 cycles produces an output from the tracking discriminator which accomplishes several results: First, the 240-cycle-per-second tone serves to actuate the clamp gate 158, thereby locking out the output from the slew discriminator 156 to the oscillator 150; it serves to inject a bias signal into the limiter 155 to appreciably decrease the normal gain of that stage; and finally it serves to provide additional reference data with which to control oscillator 150. For example, assume that the oscillator 150 was off frequency by 50 cycles at the time clamp gate 158 was closed. The 240-cycle-per-second signal passed by the matrix adder 108 at the transmitter would then appear as either a 190-cycle-per-second or a 290-cycle-per-second tone at the output of the single sideband demodulator 152, depending upon the sense of the error. The output of the tracking discriminator 162 will be a direct current voltage of proper polarity to drive the oscillator 150 in a direction to correct the error. The internal time constants of tracking discriminator 162 are such that its output responds rapidly to new data. However, sufficient persistence is included so that its output does not vary by more than 1% during the syllabic intervals when the 240-cycle-per-second tone is not transmitted because of the action of the inhibit gate 116 in the transmitter.

The speech data passed by the single sideband demodulator 152 will be acted upon by a high-pass filter 164 having a transfer characteristic such that audio below 300 cycles per second is increasingly attenuated. The data passed by the filter 164 is amplified in an audio amplifier 166 and applied to a suitable transducer, such as a headset 168 or a loud speaker 170. The response characteristic of headsets operationally deployed for use in airborne voice communications lends itself to spectral filtering of this type in that the headsets are very poor transducers below 300 cycles per second.

In summary, this invention automatically provides for frequency correction of errors at the receiver in excess of 1200 cycles per second due to Doppler. The implementations described have been for the case where the local oscillator used at the second mixer stage in the receiver is voltage controlled. This was done to conserve bandwith at the single sideband filter, but the concept can be used for oscillator control in other stages; for example, when operating in the HF portion of the spectrum where Doppler shift is of much lower magnitude, it may well be that voltage control of the oscillator at the single sideband demodulator is preferable, and also under these circumstances, only the tracking tone may be required.

In addition, it is not intended that the invention be limited to the exemplary 1440 and 240-cycle-per-second tones, but other frequencies may be used. Moreover, for implementation in the UHF portion of the spectrum, control of the tunable frequency oscillator by means of frequency synthesizer techniques may be employed advantageously. For the operational example cited, when operating at 300 megacycles aboard two 1250-knot aircraft, the Doppler shift amounts to a total excusion upwards of 2200 cycles as the aircraft approach, meet, and pass by each other at close range. For operation under these conditions, control of either the first or second local oscillator appears desirable.

In addition, it seems feasible that the rate of change of voltage from the tracking discriminator can be made to provide useful data in itself. For example, an aircraft in communication with a single sideband station on the ground would be able to determine, at least in a gross sense, when it was flying toward or circling the ground station at a fixed range. Second, the slope of the Doppler shift curve provides data on the proximity of one aircraft to another with which it is in communication.

Also, it is not intended that the 125-millisecond delay used at the beginning of each channel activation cycle be a limiting criterion. Rather, the time is chosen as a compromise between how quickly the voltage-controlled oscillator can be shifted, and the time beyond which the transmitter operator will not want to wait before commencing his voiced message. If the slewing time is kept short, that is, under an eighth of a second, no special precautions need be taken. If the local oscillator is not slewed to the proper frequency in a reasonably short time, a "Ready" light may be added to activate the gate at the output of the speech pre-amplifier, signifying channel readiness to the transmitter operator.

It is intended therefore that this invention be limited only by the scope of the appended claims as read in the light of the prior art.

What is claimed is:

1. In a transmitter-receiver communications system, the combination comprising:

a source of intelligence signal in a given frequency spectrum;

a source of fixed reference signal having a fixed frequency;

a source of modified reference signal having modified characteristics as compared to said fixed reference signal;

an adder;

a normally closed intelligence signal gate;

a normally open reference signal gate;

a normally closed modified reference signal gate;

switch means operable for connecting said source of intelligence signal, said source of fixed reference signal, and said source of modified reference signal to said adder through said normally closed intelligence signal gate, said normally open reference signal gate, and said normally closed modified reference signal gate, respectively;

a delay network for generating a gating voltage a predetermined period after operation of said switch means, said gating voltage being applied simultaneously to each of said gates to close said open reference signal gate, to open said modified reference signal gate, and to open said intelligence signal gate;

means for transmitting the output of said adder to a remote receiver;

means at said remote receiver for detecting said fixed reference signal, said modified reference signal, and said intelligence signal;

a slew discriminator tuned to the frequency of said fixed reference signal, said detected fixed reference signal being applied to said slew discriminator for developing an output voltage having a magnitude and polarity proportional to the deviation in frequency from said fixed frequency, said output voltage controlling the frequency of operation of said receiver;

a second discriminator tuned to the frequency of said modified reference frequency, said detected modified reference signal being applied to said second slew discriminator for developing a second output voltage having a magnitude and polarity proportional to the deviation in frequency from the frequency of the transmitted modified reference signal, said second output voltage cutting off the output of said first slew discriminator, and further controlling the frequency of operation of said receiver; and a transducer driven by said detected intelligence signal.

2. The invention as defined in claim 1, wherein said receiver includes a local oscillator having an output mixed with received signals to produce an intermediate frequency, and wherein the frequency of said local oscillator is controlled successively by the outputs from said first and second discriminators, respectively.

3. The invention as defined in claim 1, wherein said modified reference source comprises a signal attenuator coupled to said source of fixed reference signal.

4. The invention as defined in claim 3, and means intermediate said adder and said source of intelligence signal for rejecting a redundant range of the frequency spectrum of said intelligence signals, the frequency of said reference signal being at the center of said redundant range.

5. The invention as defined in claim 4, and means intermediate said detecting means of said receiver and said transducer for rejecting detected signals in said redundant range from said transducer.

6. The invention as defined in claim 5, and a filter for passing only signals in said redundant range, said filter being connected intermediate said detecting means and said second slew discriminator.

7. The invention as defined in claim 1 wherein said source of modified reference signal comprises a frequency divider coupled to said source of fixed reference signal to produce said modified reference signal at a frequency below said frequency spectrum of said intelligence signal;

a normally closed additional gate interposed between said modified reference source and said adder; and means responsive to the reduced power level of said intelligence signal for opening said gate.

8. The invention as defined in claim 7, and a filter interposed between said transducer and said detected intelligence signal for passing signals in said given spectrum and for rejecting said modified reference signals.

9. The invention as defined in claim 8, and a low-pass filter interposed between said detecting means and said second discriminator for passing only said modified reference signal to said discriminator.

10. In a transmitter-receiver communications system, the combination comprising:

a source of intelligence signal in a given frequency spectrum;

a first source of reference signal within said spectrum;

means for initially transmitting said reference signal to a remote receiver;

means after a predetermined delay period for inhibiting the transmission of said reference signal and for transmitting said intelligence signal;

a second source of reference signal having a frequency adjacent said spectrum;

means responsive to the power level of said intelligence signal for transmitting said second reference signal when the power level of said intelligence signal is below a predetermined level;

means at said receiver for detecting each of said first and second reference signals and said intelligence signals;

means responsive to a difference in frequency between said detected first reference signal and said transmitted first reference signal for controlling the frequency of operation of said receiver during said delay period;

means responsive to a difference in frequency between said detected second reference signal and said transmitted second reference signal for controlling the frequency of operation of said receiver after said delay period; and a transducer driven by said detected intelligence signal.

11. The invention as defined in claim 10 wherein said means for detecting said signals includes a controllable oscillator controlled in response to said differences in frequency.

12. The invention as defined in claim 10 wherein the frequency of said second reference source is a submultiple of said first reference source and is below the frequency spectrum of said intelligence signal.

13. The invention as defined in claim 11, and means for rejecting received second reference signals from said transducer.

14. In a transmitter-receiver communications system, the combination comprising:

a source of intelligence signal in a given frequency spectrum;

a reference oscillator having an output within said spectrum for providing a first reference signal;

a frequency divider for dividing a portion of said reference oscillator output for providing a second reference signal below said spectrum;

means for transmitting a modulated carrier to a remote receiver;

a first normally open gate;

first switch means for applying said first reference signal to said transmitter means, said first reference signal modulating said carrier;

a second normally closed gate;

second switch means for applying said intelligence signal through said second gate to said transmitting means, said intelligence signal modulating said carrier;

a third normally closed gate in series with a fourth normally open gate for applying said second reference signal to said transmitting means, said second reference signal modulating said carrier;

means for simultaneously closing said first and second switches;

a delay network for generating an output voltage a predetermined period after the closing of said switches, said output voltage closing said normally open first gate and opening said normally closed second and third gates;

means responsive to said intelligence signal for closing said fourth gate when the intelligence signal is above a predetermined level;

means at said receiver for demodulating each of said signals, said means including a local oscillator, the output frequency of which is controlled by an applied direct voltage;

a first discriminator supplied with said first reference signal, said first discriminator being tuned to the frequency of said transmitted reference signal and having a direct voltage output polarity and magnitude representing the difference in frequency between the transmitted and demodulated first reference signal, said output voltage being applied to said local oscillator for controlling the frequency thereof;

a second discriminator supplied with said demodulated second reference signal, said discriminator being tuned to the frequency of the transmitted second reference signal and having a direct voltage output polarity and level representing the difference in frequency between the transmitted demodulated second reference signal, said output from said second discriminator being applied to said local oscillator for further controlling the frequency thereof.

15. The invention as defined in claim 14, and a normally open gate between said first discriminator and said local oscillator, and a connection between the output of said second discriminator and said gate for closing said gate when said second reference signal is demodulated.

References Cited by the Examiner

UNITED STATES PATENTS

| | | | |
|---|---|---|---|
| 2,065,826 | 12/1936 | Roosenstein et al. | 325—62 |
| 2,871,295 | 1/1959 | Stachiewicz | 325—49 |
| 3,068,416 | 12/1962 | Meyer | 325—50 X |
| 3,217,255 | 11/1965 | Broadhead et al. | 325—155 X |

DAVID G. REDINBAUGH, *Primary Examiner.*

J. W. CALDWELL, *Examiner.*